June 24, 1930.  S. J. SAVONIUS  1,766,765
WIND ROTOR
Filed Oct. 11, 1928
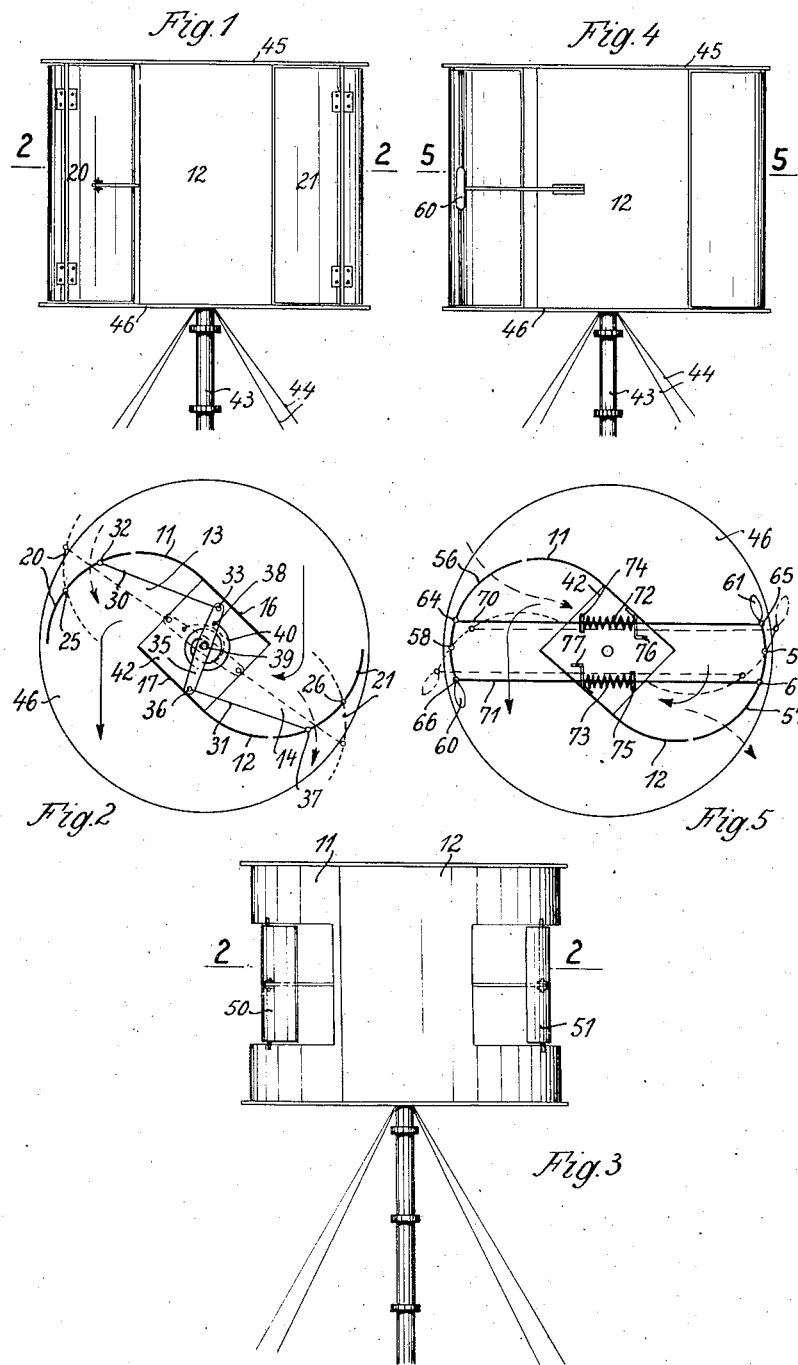
Inventor:
Sigurd J. Savonius, Patented June 24, 1930

1,766,765

UNITED STATES PATENT OFFICE

SIGURD J. SAVONIUS, OF HELSINGFORS, FINLAND

WIND ROTOR

Application filed October 11, 1928, Serial No. 311,793, and in Great Britain December 16, 1927.

My invention relates to wind rotors particularly of the vertical type and of the construction forming the subject matter of my prior Patent 1,697,574, dated January 1, 1929, and consisting substantially of two oppositely arranged hollow shaped vanes of generally rectilinear generatrix thus formed by cylindrical, parabolic, helical or other suitable surfaces and arranged so that the inner edge of the vane extends to the segmental space bordered by the other vane, both said vanes thus overlapping each other at their inner edges and forming a gap or air passage adapted to force the air current from the hollow side of one vane to the hollow side of the other vane in an S-like path of substantially constant area.

My invention comprises a regulating device which in the wind rotor specified in my above mentioned prior patent permits of the use of a regulating arrangement, which does not interfere with the normal flow of the wind around the vanes and thus permits the most favourable operation, while a preferably automatic regulation takes place as soon as the rotor exceeds a predetermined speed.

According to my invention preferably controlable outlet or inlet openings are provided in the vanes and particularly at those places at which changes occur in the direction, the speed or the pressure of the flowing medium. The outlet openings may preferably be controlled in dependence on the working conditions of the wind rotor, such as the speed of the rotor, the pressure or the speed of the flow by altering the passage area by means of shutters, flaps and the like.

In a preferred embodiment of my invention, one or more flaps are provided on the circumference of the vane, which during normal operations adapt themselves to the curvature of the vanes, but which, when a regulation is to be effected, are placed transversely to the face of the vane and thus uncover the passages, openings or ports for the stream of air.

For facilitating the understanding of my invention, some embodiments of it are by way of example and diagrammatically illustrated in the accompanying drawing.

In the drawings,

Fig. 1, is a side elevation of my improved wind rotor, in which the flaps have the same height as the vanes;

Fig. 2, is a horizontal section along line 2—2 of Fig. 1;

Fig. 3, is a modified design of my improved wind rotor in which the flaps controlling the openings in the vanes extend across a part of the height of the vanes only;

Fig. 4, is a still further modification of my improved wind rotor in side-elevation, and Fig. 5, is a horizontal section along line 5—5 of Fig. 4.

Referring to the drawing, 11 and 12 are two vanes of a preferred construction of my improved wind rotor according to the specification of my prior Patent 1,697,574.

In this construction, the wind rotor comprises two curved vanes the inner edges of which overlap and leave between them a central air passage, and form between their parallel walls a path for the flow of the wind placing the inner spaces or chambers 13, 14 of the vanes 11, 12 in communication with each other. The walls 16, 17 parallel to each other may be tangential continuations of cylindrical or conical bent inlet surfaces. The leading curve of the cylindrical or conical bent surface may be of any suitable form, for instance, parabolic or as shown in the drawing may form a circle of about 145° described around a centre situated upon or in the vicinity of the line connecting the outer end of the vanes, approximately at half the distance of the outer end of the vane from the axis of rotation of the rotor.

The vanes extend preferably between an upper solid end disc 45 and lower one 46.

According to my invention, there are provided openings in the walls of the vanes, more particularly at the points of the vane channels at which occur changes in the direction, speed or pressure of the flowing medium, which in the embodiment illustrated in the drawing are controlled by means of flaps.

In the embodiment of my invention shown in Figs. 1 and 2, a flap of the vane 11 is indicated by the reference numeral 20, and that of the vane 12 by 21. The two flaps extend across the entire height of the vanes. These flaps may be controlled by hand or automatically in dependence on the working conditions. In a preferred embodiment as shown in the drawing, the centrifugal force is utilized for the regulation. The flaps 20, 21 are pivoted in hinges 25, 26 and in such a manner that the hinges are situated sideways or excentrically of the centre of the forces acting upon the flaps when operating them, preferably the centrifugal force. Under the action of the centrifugal force on the excentric weights of the flap, this has the tendency to swing outwards. To control this tendency, forces are provided in my preferred construction which oppose or counteract the centrifugal force.

In the example shown in the drawing, the arrangement is such that the corresponding flaps 20, 21 of the two vanes 11, 12 are coupled together or interlocked so that they move in unison. The coupling system comprises rods 30, 31 hinged to the flaps at 32, 37 and pivoted at their other ends 33, 36 to the ends of a double-armed transverse lever 35. To this lever is attached one end 38 of a spiral spring 40 the other end of which is attached to fixed points of the rotor for instance to the bridge piece 42 fixed to the two ends of the vanes 16, 17.

In this way is ensured an absolutely uniform motion of the two flaps. By a suitable arrangement or disposition of the points of engagement of the flaps and suitably dimensioning the spring it may be brought about that at normal speeds of the rotor the flap lies completely within the surface of the vane, while, as soon as the speed exceeds a predetermined value the flaps move outwards under the action of the centrifugal force, as indicated in Fig. 2 in which the new position of the vanes 20, 21 is shown in dotted lines. In this way the flow outlet is opened and the medium which in normal operation traverses the rotor in the direction of the arrows shown in full lines, may pass outside through these openings, or, since the flaps act as vanes directed outwards, an additional flow may enter through the openings as indicated by the dotted arrows, so that the motion of the rotor may be regulated, so as to keep the rotary speed within certain limits.

The flap need not extend across the entire height of the vanes; they may equally well extend across a smaller or larger portion of this height or width, as shown by way of example in the embodiment of my invention illustrated in Fig. 3 of the drawing, in which the flaps are indicated by the reference numerals 50, 51.

While in the construction illustrated in the Figs. 1 to 3 the flaps or doors open towards the outside, the Figs. 4 and 5 illustrate a further embodiment in which the flaps 56 of the vane 11 and 57 of the vane 12 open towards the inside, as indicated in broken lines in Fig. 5. The two flaps are adapted to turn on pivots 58 and 59 and are connected with each other by rods 70, 71 hinged at 64, 65 and 66, 67. The rods are controlled by springs 72, 73, one end of each of which 74 or 75 is attached to the rod, while the other end 76 or 77 is fixed to the bridge 42 connecting the inner ends of the vanes. At the ends of the flaps are provided weights 60, 61. As soon as the rotor attains or exceeds a certain speed the weights move outwards as soon as the centrifugal force acting upon the weights overcomes the resistance of the springs, while the portion of the flap adapted to close the opening in the vane moves inwards. The stream of air which in normal operations flows in the direction of the arrows drawn in full lines can now issue from the openings or even enter through the openings as shown by the dotted arrows so that the rotor may be regulated and braked.

My improved rotor is supported upon a pole 43 steadied by guy ropes or stays, 44, and may be supported by any kind of tower structure.

By suitable dimensioning the parts concerned the result may be attained that even in the event of very high wind velocities the speed of the rotor is subject to small fluctuations only.

It will be readily understood that my invention is by no means limited to the embodiments described and illustrated by way of example, but that it is equally well applicable for other shapes of vanes or sails and for other operating systems and forces for controlling the openings in the vanes.

I claim:—

1. A rotor comprising two oppositely curved vanes overlapping each other in the centre, there being a gap between the inner sides of said vanes, the walls of the vanes being provided with openings particularly at the places of the vane channels where changes occur in the stream relations, regulating flaps for said openings, and interlocking means for the corresponding flaps of said vanes adapted to cause said flaps to move in unison.

2. A rotor comprising two oppositely curved vanes overlapping each other in the centre, there being a gap between the inner sides of said vanes, the walls of the vanes being provided with openings particularly at the places of the vane channels where changes occur in the stream relations, regulating flaps for said openings, interlocking regulating means adapted to move relatively to said vanes in dependence on working conditions, and coupling means coupling said regulating flaps to said regulating means.

3. A rotor comprising two oppositely curved vanes overlapping each other in the centre, there being a gap between the inner sides of said vanes, the walls of the vanes being provided with openings particularly at the places of the vane channels where changes occur in the stream relations, regulating flaps for said openings, eccentric weights at said flaps, and interlocking means for said excentric weights.

4. In a rotor in combination two oppositely curved vanes overlapping each other in the centre, there being a gap between the inner sides of said vanes, the walls of the vanes being provided with openings particularly at the places of the vane channels where changes occur in the stream relations, regulating flaps at the openings, rigging connecting corresponding flaps of said vanes, said rigging adapted to move said flaps in unison, excentric weights at said flaps, spiral springs on each rigging, said springs being connected at one end to said rigging and at its other end to a fixed point of said rotor.

5. A rotor comprising two oppositely curved vanes overlapping each other in the center, there being a gap between the inner sides of said vanes, thus forming a vane channel, said vanes being provided with openings in their walls at the places of the vane channel where changes occur in the stream relations, regulating flaps for said openings, and means connecting said flaps to cause them to move in unison.

In testimony whereof I affix my signature.

SIGURD J. SAVONIUS.